United States Patent [19]

Sayous

[11] 4,069,004
[45] Jan. 17, 1978

[54] DEVICE TO EMIT SHOCK WAVES, WITH ADJUSTABLE CAPACITY

[75] Inventor: Leon Sayous, Pau, France

[73] Assignee: Societe Nationale Elf Aquitaine (Production), Paris, France

[21] Appl. No.: 696,351

[22] Filed: June 15, 1976

[30] Foreign Application Priority Data

June 20, 1975 France .................................. 75.19452

[51] Int. Cl.² ............................................. F23C 3/02
[52] U.S. Cl. ....................................... 431/1; 181/117;
181/118
[58] Field of Search .................... 431/1, 158; 181/118,
181/117, 401, 402

[56] References Cited

U.S. PATENT DOCUMENTS

| 3,240,254 | 3/1966 | Hughes | 431/1 X |
|---|---|---|---|
| 3,333,619 | 8/1967 | Denis | 431/1 X |
| 3,473,879 | 10/1969 | Berberich | 431/1 X |
| 3,478,838 | 11/1969 | Kilmer | 181/118 |
| 3,480,102 | 11/1969 | Kilmer | 181/117 |
| 3,750,837 | 8/1973 | Wood | 181/118 |
| 3,880,568 | 4/1975 | Melton et al. | 431/1 |
| 3,954,380 | 5/1976 | Valaev | 431/1 |

Primary Examiner—Edward G. Favors
Attorney, Agent, or Firm—Brisebois & Kruger

[57] ABSTRACT

This invention concerns a device for emitting shockwaves, with adjustable capacity.

Such a device comprises a valve, a barrel with a seat for this valve, barrel and valve being on the same axis, and forming between them an annular combustion chamber, which can be placed in communication with the outside atmosphere by axial movement of the valve, and which comprises means of admitting the oxidant-fuel mixture, the said valve forming a differential piston, one side of which forms a mobile wall of a pressurized fluid chamber, and part of the other side of which forms a mobile wall of the combustion chamber. In this device a fixed wall of the combustion chamber contains at least two regularly spaced apertures at its perimeter, into which fit removable plugs, each of which comprises a cavity opening into the combustion chamber, and which comprise means of admitting fuel and oxidant, and ignition means. The device generates compression waves for seismic exploration.

2 Claims, 3 Drawing Figures

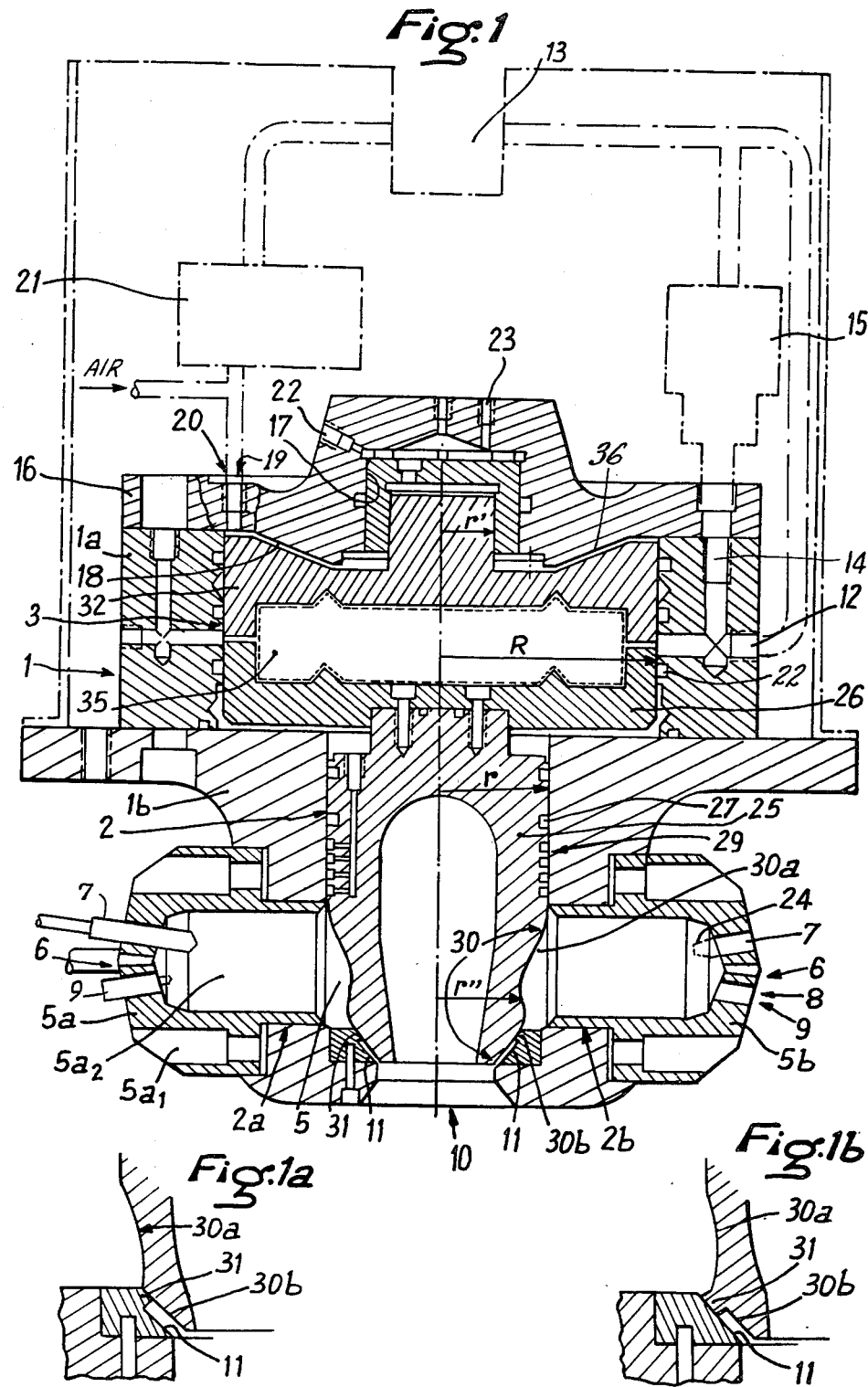

DEVICE TO EMIT SHOCK WAVES, WITH ADJUSTABLE CAPACITY

This invention concerns a device to emit shock-waves, with variable volume or capacity.

The applicant's earlier French patent application N' 74 18911 (U.S. application Ser. No. 582,241, now U.S. Pat. No. 3,981,379), relates to means of applying pressures of around 800 bars to an extensive impact area. The increased quantity of energy involved, and improvement in the transmission coefficient, restrict the number of such devices needed, and even allow the use of a single firing device.

The problem then arises of adjusting the quantity of energy released by an explosion, to suit the features of the sea bed and the cross-section of the ground being investigated, as regards both the type of rock and the thickness of sedimentary layers.

To avoid returning to the practice of increasing the number of emitting devices per firing point, it appeared that it might be possible to create a range of shock-wave emitting devices with increasing cylinder capacities. However, this was at once recognized to be financially wasteful, and to involve difficult operations at sea.

The device described in the present invention overcomes these drawbacks, by offering a simple method of altering the volume or capacity of a shock-wave emitting device.

The novel device in accordance with this invention comprises a valve, a barrel with a seat for this valve, said barrel and valve being mounted coaxially and forming between them an annular combustion chamber adapted to be put in communication with the outside atmosphere by axial movement of the valve, said chamber comprising means of admitting the oxidant-fuel mixture, the said valve being constituted by a differential piston, one side of which forms a mobile wall of a pressurized fluid chamber, and part of the other side of which forms a mobile wall of the combustion chamber, in which device a fixed wall portion of the combustion chamber contains at least two regularly spaced apertures at its periphery, into which fit removable plugs, each of said plugs comprising a cavity opening into the combustion chamber.

In one recommended embodiment, each one of said plugs comprises means of admitting fuel and oxidant, and an ignition system, opening into the cavity.

It will be easier to understand the invention from the following description of one of the possible embodiments, illustrated by the accompanying figures, in which:

FIG. 1 shows the adjustable-volume wave-emission device;

FIG. 1a shows one type of valve-seat;
FIG. 1b shows another type of valve-seat.

In the embodiment illustrated in FIG. 1, the shock-wave emitting device comprises a barrel 1, constructed in two parts 1a and 1b, to make machining and assembly easier. These two parts are assembled by pins and bolts. The cylindrical barrel 1 comprises two cylindrical cavities, a lower cavity 2, of radius $r$, and an upper cavity 3, of radius $R$, the ratio of $R$ to $r$ being between 1 and 4.

The inner profile of the lower cavity 2 partly delimits an annular cavity 5. At least two cylindrical cavities such as 2a and 2b are evenly spaced round the perimeter of the lower cavity 2, being axially perpendicular to the center-line of the cavity 2. Plugs 5a and 5b fit into cavities 2a and 2b, and are attached to the part 1b bolts (such as 5a1). Each such plug has a cylindrical cavity (such as 5a2), opening into the annular cavity 5. These plug cavities can have volumes ranging from 6 to 1,000 cc, so that, for a device containing four such plugs, 5a to 5d, there is a range of extra capacities, in addition to the volume of the cavity 5, extending from 24 to 4,000 cc.

Various ducts open into each plug cavity: a compressed-air inlet 6, a fuel inlet 7, and a passage 8 for an ignition system 9.

The lower cavity 2 opens into the outside atmosphere through a round axial opening 10 in the barrel 1, with a tapering section 11.

The upper cavity 3 is open over its full area at the top, and it has at least two apertures in the middle, an inlet 12, for compressed air delivered by a three-way electrovalve 13, and a compressed air outlet 14, leading to a valve 15 monitored by the same electrovalve.

The cavity 3 is closed at the top by a cylindrical cap 16, coaxial with and attached to the barrel 1, and containing a cylindrical recess 17, on the same axis as and communicating with the cavity 3. The ratio of the radius $r'$ of this recess to the radius $R$ of the cavity 3 is between 2 and 5. The cap 16 limits the cavity 3 by an annular surface 18.

A compressed-air inlet 19 and outlet 20, leading to a valve 21 also monitored by the electrovalve 13, open on to the annular surface 18. In this figure, these two apertures 19 and 20 share the same passage.

The top of the recess 17 contains a fuel-inlet passage 22, and one or more outlets (such as 23) for this same fuel, which then passes through the duct 7 leading to the plug-cavity, supplying a nozzle 24.

A valve 25 fits into the barrel 1, sliding inside the cavity 2 and attached to a piston 26, which slides inside the lower half of the cavity 3. This valve carries at least one sealing ring 27 at its upper end, and the piston is also fitted with a sealing ring 28.

The larger part 29 of the cylindrical valve 25 has a circular cross-section, but the valve continues downwards in a cylindrical section 30a, the radius $r''$ of which is less than the radius $r$ of the upper part 29, and ends in a tapering portion 30b, the angle at the apex of which corresponds to the angle of the tapering passage 11. The outer surface of the cylindrical part 30a, in conjunction with the inner surface of the cylindrical cavity 2, forms the annular cavity 5.

The tapering surface 31 of the valve 25 rests on the tapering passage 11, on a projecting annular surface, which is an integral part of the barrel 1, in the embodiment shown in FIG. 1 and 1a.

FIG. 1b shows another enbodiment, in which the projecting surface 31 is an integral part of the valve 25. Whether part of the seat, or of the valve, this projection is several tenths of a millimeter high and several millimeters wide.

In the embodiments illustrated in FIGS. 1a and 1b, the surfaces 30b of the valve seat 11, and of the valve facing this valve seat outside the combustion chamber, are at the same angle to their shared centre-line, and the distance separating them is the same as the height of the projection 31.

The projection along the axis $xx'$ of the tapering surface 30b is equal to at least 25% of the projection along the axis $xx'$ of the tapering surface 30.

Inside the upper cavity 3 and cylindrical recess 17 slides a differential-section piston 32, with sealing rings on the part moving inside the cavity 3 and on the part moving inside the recess 17.

The central part of the cavity 3, between pistons 26 and 32, when the pistons are apart, forms a compressed-fluid chamber 35, or pneumatic chamber.

The part of the cavity 3 between the piston 32 and cap 16, when the piston moves away from the cap, forms an annular chamber 36, occupied by the same compressed fluid as that occupying the chamber 35.

The shock-wave emission device illustrated in FIG. 1 functions in the same way as the device described in U.S. Pat. No. 3,981,379 does, in other words as described below.

Ejection of burnt gas from the device can be controlled or automatic. Under normal seismic investigation conditions, it is controlled from the recording laboratory. For automatic operation, the recording laboratory has to be brought under control of the device.

In both cases, the oxidant gas is admitted permanently through the passage 6 into the combustion chamber 5, while compressed air is simultaneously admitted through the passage 19 into the chamber 36. This air pushes the piston 32 downwards and presses on the piston 26, which in turn presses the valve 25 against its seat 11, thereby shutting the combustion chamber 5.

The coil of the three-way electrovalve 13 is energized, so that compressed air is admitted simultaneously into the monitored valves 15 and 21, and through the passage 12 into the chamber 35. The valve 15 blocks the passage 14, and the valve 21 places the chamber 36 in communication with the outside atmosphere. Valve 15 is a normally open piloted valve which is held closed when it is pressurized with air from valve 13. Valve 21 is a normally closed piloted valve which is held open when it is pressurized with air from valve 13. Air entering the chamber 35 performs two functions simultaneously: it holds the valve 25 against its seat 11, and it pushes the piston 32 back up.

Because of the effect of the differential section, this piston discharges the fuel in 17 at high pressure into the passages 7, so that it passes through the nozzles 24 into the chamber 5, where it ignites in contact with the ignition system 9. The very fast combustion turns the fuel-oxident mixture into combustion gases at high temperature and pressure.

First type of functioning: controlled ejection

The air admitted into the chamber 35 by the electrovalve 13 is at the right pressure to keep the valve 25 shut when combustion is completed.

To eject combustion gas, the electrovalve 13 is de-energized, so that the piloted valve 15 releases the air from the chamber 35, and places this chamber in communication with the outside atmosphere, the valve 25 is no longer held against its seat, and the upward thrust of gas on the surface 30 raises the valve 25, so that it releases combustion gas at a very high rate. Simultaneously, the monitored valve 21 blocks the passage 20, and compressed air entering through the passage 19 gradually restores the device to the position for a new cycle. This operation lasts long enough for all combustive gas to be discharged Second type of functioning: automatic ejection Air admitted into the chamber 35 by the electrovalve 13 is at a pressure such that, for an intermediate combustion-gas pressure, less than the normal pressure on completion of combustion and more than the initial oxidant-gas pressure, the valve 25 is no longer held against its seat 11, and the upward thrust on the surface 30 raises the valve 25. Gas enters the space between the valve 25 and seat 11, thereby increasing the area of upward thrust, and making the valve 25 rise faster.

Combustion gas is released at a very high rate.

When the electrovalve 13 is de-energized, air in the chamber 35 is discharged, and the final phase of the operation is the same as for controlled ejection.

To summarize, the difference between the two types of functioning is that:

for controlled ejection, the compressed air admitted into the chamber 35 keeps the valve 25 shut, and the firing order is given by de-energizing the electrovalve 13;

for automatic ejection, the compressed air admitted into the chamber 35 no longer keeps the valve 25 shut, once the combustion gas in the chamber 5 reaches a certain pressure, and opening takes place without de-energizing of the electrovalve 13.

Fuel consumption for injection into a chamber at 140 bars is 2 cubic centimeters of gas-oil per 16 cubic centimeters of chamber capacity.

For controlled operation, emissions are 6 to 10 seconds apart. For automatic operation, emissions take place at the rate of about one every 5 seconds.

If air at a pressure of 140 bars is used as oxidant, the emission pressure normally reached is 800 bars; pressures of 1,200 and even 1,400 bars can be achieved by using oxygen-enriched air.

In an embodiment illustrated by FIG. 1, combustion gas is injected axially downwards into the liquid medium.

This helps to focus expansion energy onto an area located beneath the device, and increases the sound-wave emission spectrum towards high frequencies.

This shock-wave emission device allows emission power to be adapted to suit the characteristics of the sea-bed in the area to be explored, and the cross-section of ground to be investigated using the seismic method.

It has also been found that the arrangement of the plugs containing the extra combustion chambers, spaced regularly round the lower part of the barrel, and projecting outwards from it, allows better cooling of the metal, and thus more effective removal of calories produced by successive explosions. This makes operations at high and very high powers easier, compared with what has been observed with various emitting devices not comprising combined combustion chambers.

What is claimed is:

1. A shock-wave emitting device comprising a valve, a barrel with a seat for this valve, said barrel and valve being arranged coaxially, and forming between them an annular combustion chamber, which can be placed in communication with the outside atmosphere by axial movement of the valve, and which comprises means of admitting the fuel-oxidant mixture, and ignition means, the said valve comprising a differential piston, one side of which forms a mobile wall of a pressurized fluid chamber, and part of the other side of which forms a mobile wall of the combustion chamber, a fixed wall portion of the combustion chamber containing at least two regularly spaced apertures at its periphery, into which fit removable plugs, each of which comprises a cavity opening into the combustion chamber.

2. A device as defined in claim 1, in which each plug comprises means of admitting fuel and oxident, and ignition means, opening into the cavity.

* * * * *